United States Patent
Shimizu et al.

(10) Patent No.: US 7,168,716 B2
(45) Date of Patent: Jan. 30, 2007

(54) SWING MECHANISM FOR STEERING SHAFT IN THREE-WHEELED INDUSTRIAL VEHICLE

(75) Inventors: Seigo Shimizu, Kariya (JP); Fumihiro Fukatsu, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 522 days.

(21) Appl. No.: 10/776,141

(22) Filed: Feb. 11, 2004

(65) Prior Publication Data

US 2004/0160031 A1 Aug. 19, 2004

(30) Foreign Application Priority Data

Feb. 14, 2003 (JP) ............................. 2003-036232

(51) Int. Cl.
*B60G 9/02* (2006.01)
(52) U.S. Cl. ............................................. 280/124.111
(58) Field of Classification Search .......... 280/124.11, 280/124.111, 124.116, 6.154
See application file for complete search history.

(56) References Cited

U.S. PATENT DOCUMENTS

| | | | | |
|---|---|---|---|---|
| 3,313,555 A | * | 4/1967 | Reimer | 280/104 |
| 3,917,306 A | * | 11/1975 | Madler et al. | 280/104 |
| 4,647,067 A | * | 3/1987 | Paquette et al. | 280/676 |
| 6,056,304 A | * | 5/2000 | Brambilla | 280/124.111 |
| 6,976,687 B1 | * | 12/2005 | Beleski, Jr. | 280/87.041 |

FOREIGN PATENT DOCUMENTS

| | | |
|---|---|---|
| DE | 3407947 | 9/1984 |
| DE | 4025543 | 2/1992 |
| GB | 2 136 372 | 9/1984 |
| GB | 2 136 372 A | 9/1984 |
| JP | 2000-72393 | 3/2000 |
| JP | 3109280 | 9/2000 |

* cited by examiner

*Primary Examiner*—Faye M. Fleming
(74) *Attorney, Agent, or Firm*—Morgan & Finnegan LLP

(57) ABSTRACT

A swing mechanism of a steering axle in a three-wheeled industrial vehicle has a steering axle, a pair of steerable wheels, a steering shaft, a center pin and a holder. The steerable wheels are supported on both sides of the steering axle. The steering shaft is connected to the steering axle for rotating the steering axle in a steered direction and is synchronously rotated with a steering wheel of the vehicle. The center pin is arranged at a lower end of the steering shaft in a longitudinal direction of the vehicle. The holder is formed on the steering axle and is coupled to the center pin so as to be swingable.

9 Claims, 5 Drawing Sheets

US 7,168,716 B2

SWING MECHANISM FOR STEERING SHAFT IN THREE-WHEELED INDUSTRIAL VEHICLE

BACKGROUND OF THE INVENTION

The present invention relates to a three-wheeled industrial vehicle, such as three-wheeled towing truck and three-wheeled forklift truck, with a rigid type steering axle and a steerable wheel, and more particularly to a swing mechanism which enables the steering axle to vertically swing relative to a vehicle body.

Generally, for example, in a three-wheeled forklift truck with a rear axle (a rigid type steering axle 2) as shown in FIG. 4 or in an industrial vehicle such as three-wheeled towing truck with a front axle (a rigid type steering axle) and a rear axle (a driving axle), the driving axle for supporting a drive wheel 1 remains rigid for ensuring safety while the vehicle is normally traveling or is handling a load.

As shown in FIG. 5, the lower end of a steering shaft 21, which synchronously rotates with a steering wheel 3, is directly connected to the steering axle 2 by welding and the like, so that the steering axle 2 generally employs a rigid type axle which cannot rotate in a vertical direction relative to a vehicle body, but rotates in a steered direction in response to the operation of the steering wheel 3, as disclosed in Japanese Patent No. 3109280.

When the steering axle 2 is constantly rigid as described above, it is favorable for ensuring safety when the vehicle is handling a load. However, when one of the steerable wheels 4 moves over an obstacle such as wood block, rock or other irregularities on the floor or ground, the entire steering axle 2 is raised and then lowered. This vertical motion is directly transmitted to a body framing 5 through the steering shaft 21 and causes the vehicle to pitch thereby to affect the driving comfort. Therefore, there is a need for improving driving comfort by connecting a steering axle to a steering shaft so as to vertically swing.

SUMMARY OF THE INVENTION

In accordance with the present invention, a swing mechanism of a steering axle in a three-wheeled industrial vehicle has a steering axle, a pair of steerable wheels, a steering shaft, a center pin and a holder. The steerable wheels are supported on both sides of the steering axle. The steering shaft is connected to the steering axle for rotating the steering axle in a steered direction and is synchronously rotated with a steering wheel of the vehicle. The center pin is arranged at a lower end of the steering shaft in a longitudinal direction of the vehicle. The holder is formed on the steering axle and is coupled to the center pin so as to be swingable.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
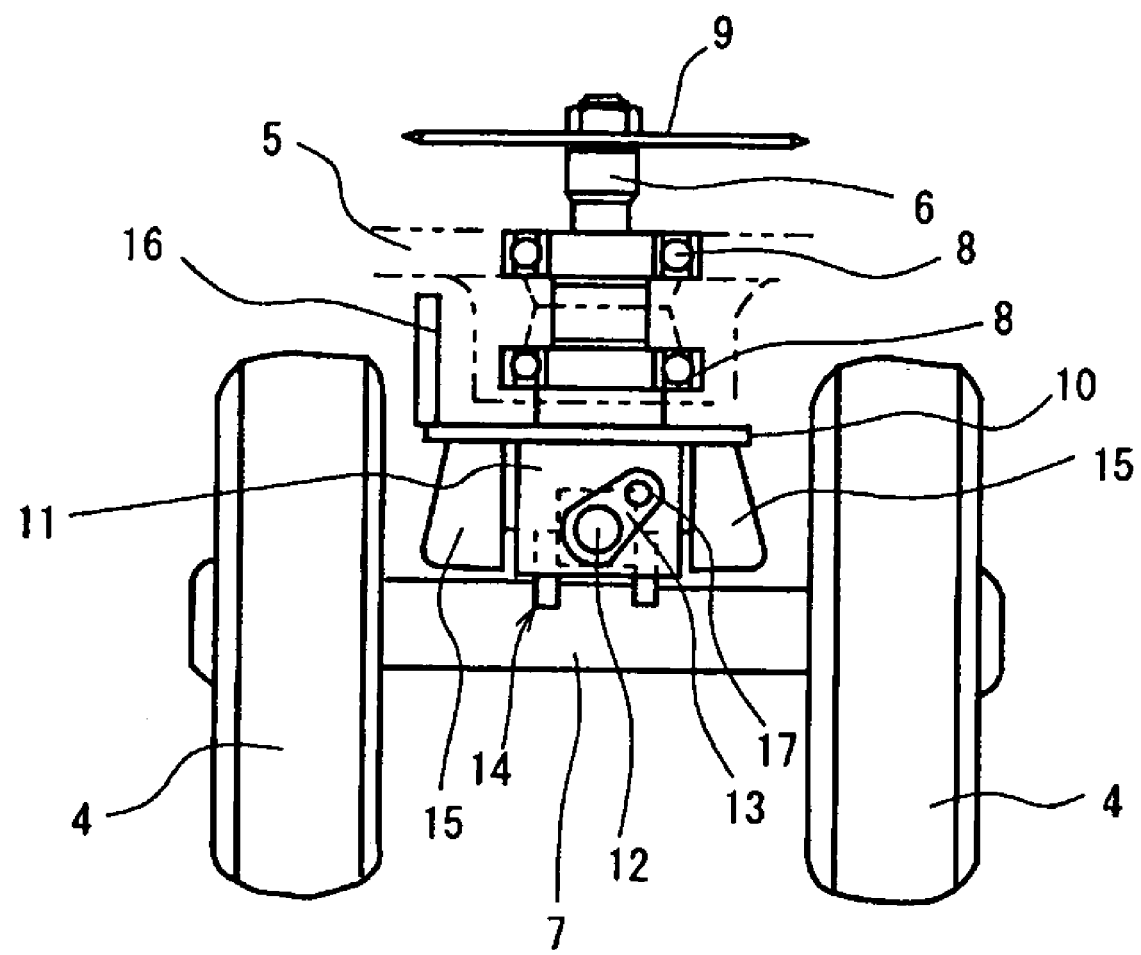
FIG. 1 is an end view of a swing mechanism of a steering axle in a three-wheeled forklift truck according to a preferred embodiment of the present invention.
Figure 2:
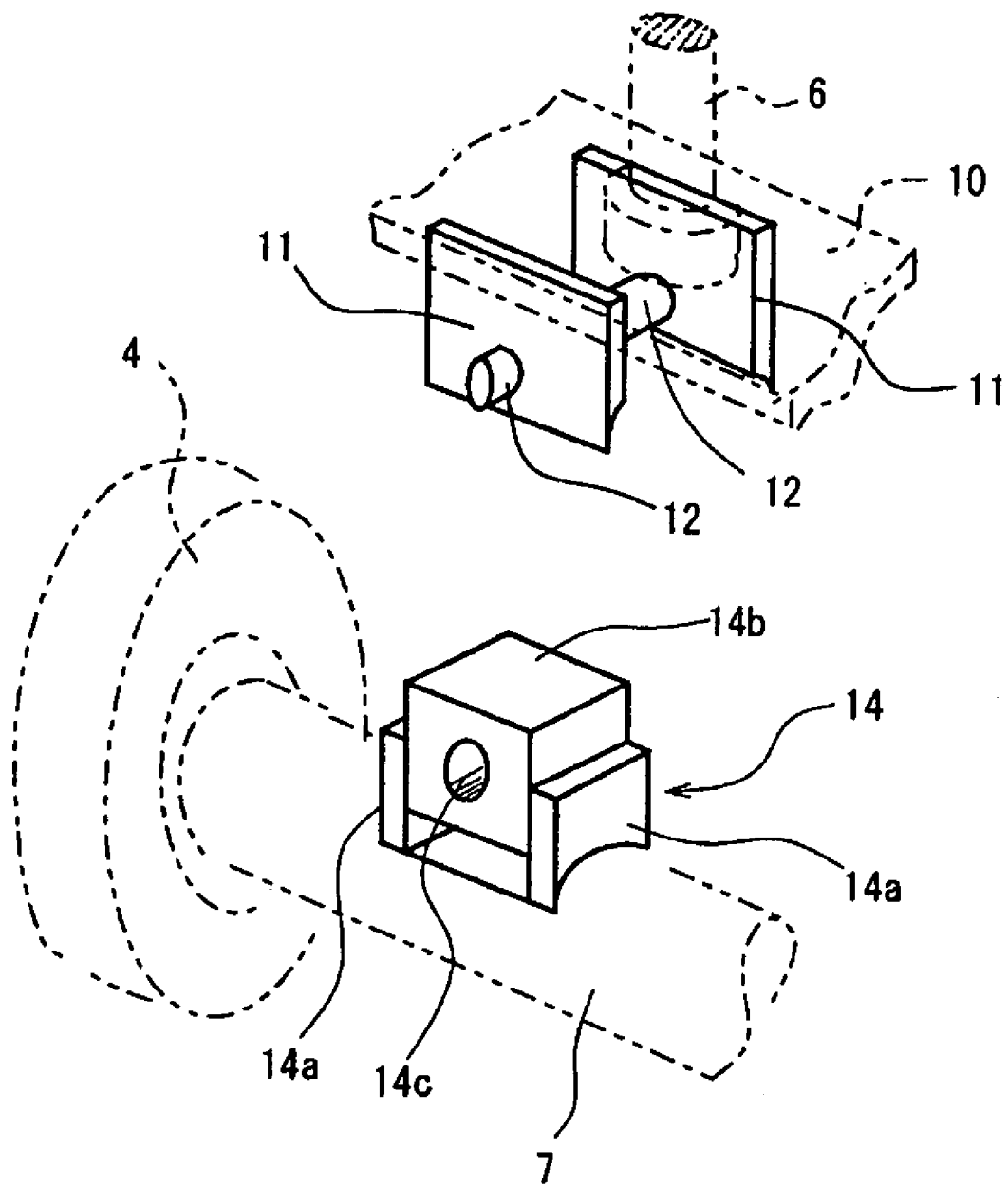
FIG. 2 is a partially perspective view of the swing mechanism of the steering axle according to the preferred embodiment of the present invention.
Figure 3:
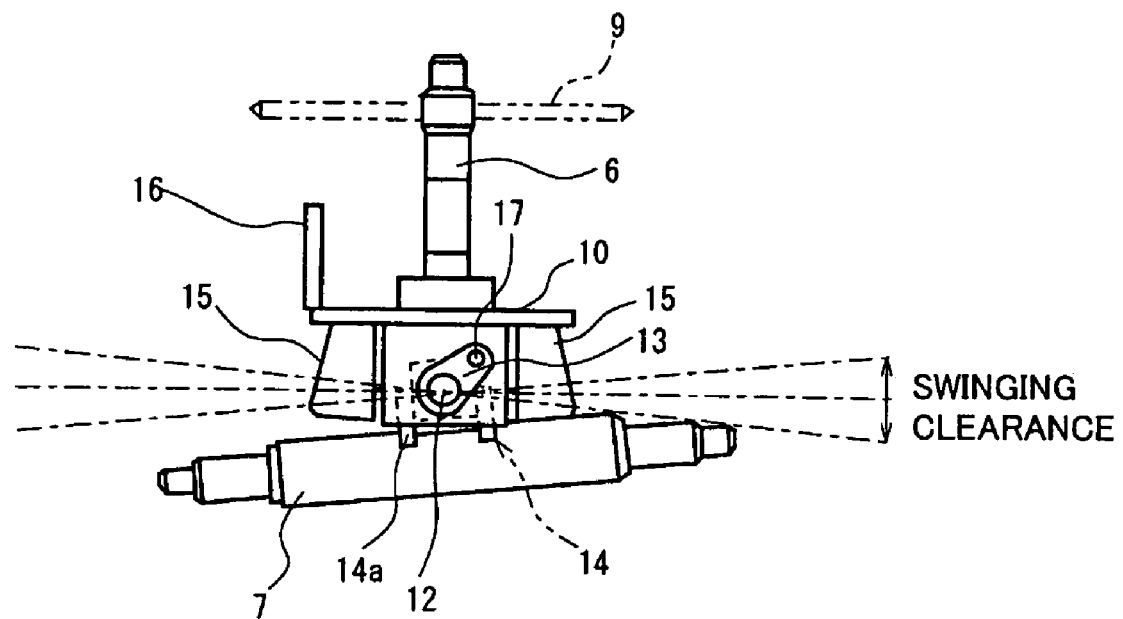
FIG. 3 is an explanatory view of the swing mechanism of the steering axle according to the preferred embodiment of the present invention.
Figure 4:
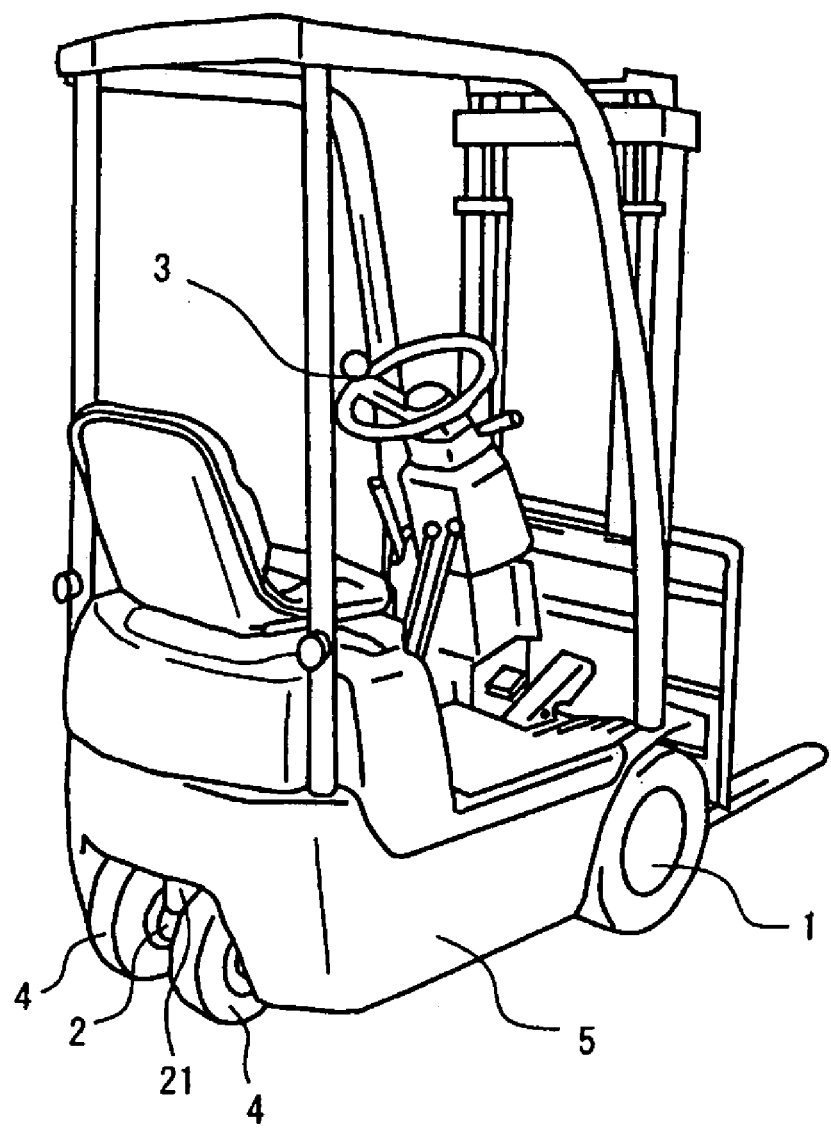
FIG. 4 is a schematically perspective view of a conventional three-wheeled forklift truck.
Figure 5:
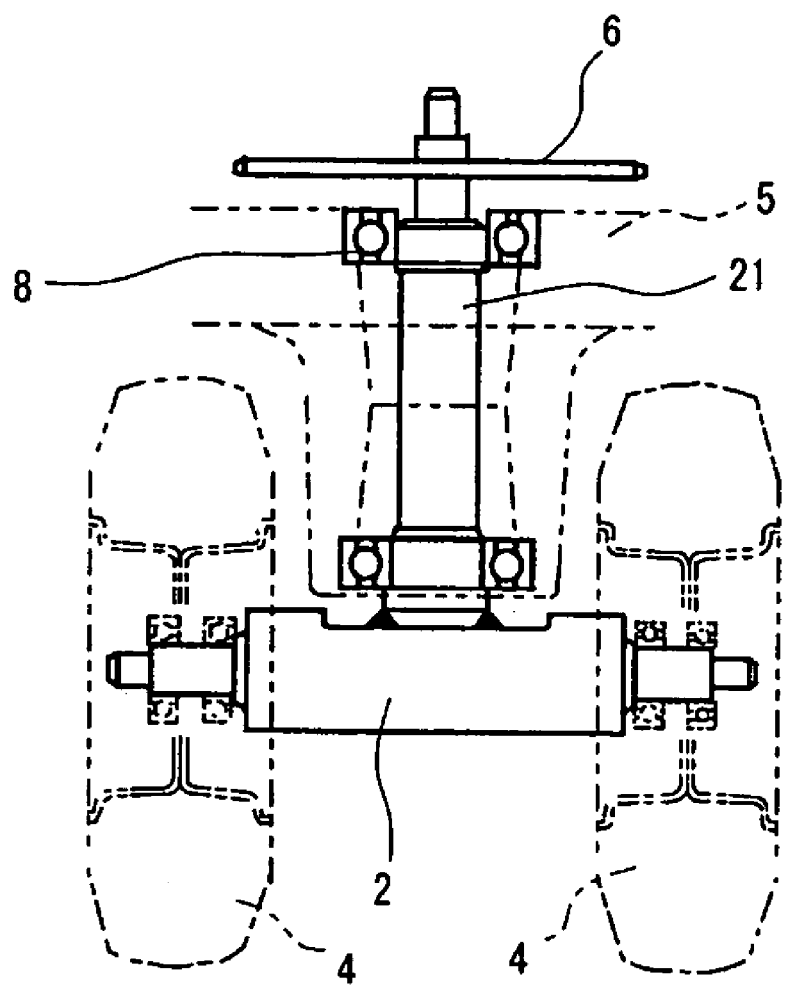
FIG. 5 is an explanatory view of a mechanism of a conventional rigid type steering axle.

A preferred embodiment of the present invention will now be described with reference to FIGS. 1 through 4.

An industrial vehicle, such as three-wheeled forklift truck and three-wheeled towing truck, has the body framing 5. In the case of the forklift truck, the vehicle has a front driving axle and a rear steering axle 7 of rigid type which are arranged on the front and rear sides of the body framing 5, respectively. In the case of the towing truck, on the other hand, the vehicle has a front steering axle 7 of rigid type and a rear driving axle which are arranged on the front and rear sides of the body framing 5, respectively. Also, the three-wheeled towing truck has a rigid type front steering axle 7 and a rear driving axle, which are respectively arranged on the front side and the rear side of the body framing 5. In such industrial vehicles, a steering shaft 6 is vertically arranged through bearing members 8 at a portion facing the middle portion of the steering axle 7 as seen in the direction of the vehicle width.

A driven member such as chain wheel 9, which forms a portion of a steering coupling mechanism, is mounted to the upper side of the steering shaft 6. The chain wheel 9 is coupled to a steering wheel 3 through a chain and turns the steering shaft 6 in a steered direction in response to the operation of the steering wheel 3.

It is noted that the steering coupling mechanism is not limited to a chain type steering coupling mechanism. A link type steering coupling mechanism, which includes a bellcrank, a kingpin and the like, may be employed instead of the chain wheel 9.

Rectangular pin holder brackets 11 are secured to the lower end of the steering shaft 6 through a stopper plate 10. More specifically, the pin holder brackets 11 are secured to the bottom side of the stopper plate 10 on the forward and rearward sides of the steering shaft 6 (as seen from the vehicle), respectively. The spaced distance between the pin holder brackets 11 is desirably larger than the diameter of the steering shaft 6 in view of the transmission of rotational force. Alternatively, the pin holder brackets 11 may be formed to have a U-shaped cross-section and its top wall may be secured to the bottom side of the stopper plate 10.

A center pin 12 extends through the front and rear pin holder brackets 11 in the direction perpendicular to the steering shaft 6 (or in the longitudinal direction of the vehicle body) under the steering shaft 6. A retaining member 13 is fitted at its proximal end to the center pin 12 and the other end of the retaining member 13 is fixed to the pin holder bracket 1 by a bolt 17. This leads to easy assembling and easy changing of components.

A holder 14 is fixedly connected to the middle portion of the steering axle 7 as seen in the direction of the vehicle width, which supports at each end thereof the steerable wheels 4. The holder 14 includes a pair of brackets 14a and a pin holder 14b. The bottom portions of the brackets 14a are fixedly connected to the steering axle 7. The pin holder 14b is fixedly fitted between the brackets 14a. The pin holder 14b has formed therein a through hole 14c extending perpendicularly to the axis of the steering axle 7 for receiving therein the center pin 12.

After the pin holder 14b is fitted between a pair of the pin holder brackets 11, the center pin 2 is inserted into the through hole 14c of the pin holder 14b. Thus, the steering axle 7 is coupled to the steering shaft 6 through the holder 14, the center pin 12 and the pin holder bracket 11 so as to be swingable on the center pin 12 and also rotatable relative to the steering shaft 6 in response to the steering rotation of the steering shaft 6.

A pair of stoppers 15 is fixedly mounted on the bottom side of the stopper plate 10 so as to depend downward therefrom. The stoppers 15 are provided at an interval spaced in the direction of vehicle width in facing relation to the steering axle 7 for regulating the swinging motion of the steering axle 7. A clearance is formed between the bottom surface of the stoppers 15 and the steering axle 7 so that the steering axle 7 is permitted to swing on the center pin 12 within the range of this clearance.

The stopper 15 is made of steel in the preferred embodiment. However, the stopper 15 may be made of an elastic material such as rubber or may be made of a damping member such as damper so as to reduce shock of contact with the steering axle 7. Also, the clearance for allowing the swinging of the steering axle 7 may be varied by changing the vertical length of the stopper 15 or alternatively by appropriately changing the shape of the lower end of the stoppers 15.

A stopper 16 is vertically disposed on the upper surface of the stop plate 10 for regulating the rotation of the steering shaft 6. The regulation is accomplished by allowing the stopper 16 to contact a suitable member protruding from the vehicle body framing 5 adjacent to the steering shaft 6.

The operation of the swing mechanism of the above steering axle 7 will now be described.

As the steering shaft 6 is rotated in response to the operation of the steering wheel 3 through the steering coupling mechanism such as the chain wheel 9 while the vehicle is traveling, the rotational force is transmitted to the holder 14 through the stopper plate 10, the pin holder bracket 11 and the center pin 12. Thus, the steering axle 7 rotates in the steered direction of the steering wheel 3 about the steering shaft 6.

When one of the steerable wheels 4 runs over an obstacle, such as wood block, rock or other irregularities on the floor or ground while the vehicle is traveling and also when the elastic deformation of the steerable wheel 7 exceeds its permissible range, the steering axle 7 is caused to swing vertically on the center pin 12 thereby to regulate the up and down movement of the entire steering axle 7.

The swinging of the steering axle 7 is blocked at a position where the steering axle 7 contacts with either one of the stoppers 15, so that interference between the steering axle 7 and the pin hole bracket 11 and the like on the side of the body framing 5 is avoided.

According to the preferred embodiment, the following advantageous effects are obtained.

Though the steering axle 7 is of a rigid type and, therefore, rotates integrally with the steering shaft 6, it is so arranged according to the present invention that the steering axle 7 is swingable on the center pin 12. Therefore, even when one of the steerable wheels 4 moves over an obstacle or other irregularities on the floor or ground while vehicle is traveling, the steering axle 7 only swings on the center pin 12 and the transmission of the up and down movement of the steering axle 7 to the steering shaft 12 can be prevented, so that the vehicle body framing 5 maintains a substantially level position and the driving comfort of a three-wheeled vehicle with a rigid type steering axle is improved.

Even if one of the steerable wheels 4 runs continuously over irregularities on the floor or ground, such irregularities are absorbed by swinging motion of the steering axle 7 as far as the swinging does not exceed the swinging clearance of the steering axle 7 as far as the swinging occurs within the range of the above-mentioned clearance.

Furthermore, the excessive swinging of the steering axle 7 is blocked by the stoppers 15, so that the steering axle 7 is prevented from contacting the steering shaft 6, the pin holder bracket 11 and other components. Accordingly, each component is prevented from being damaged.

The present invention is not limited to the embodiment described above but may be modified into the following alternative embodiments.

In the preferred embodiment, the steering shaft 6 and the pin holder bracket 11 are formed integrally through the stopper plate 10. In an alternative embodiment, the pin holder bracket 11 may be directly secured to the steering shaft 6.

The pin holder bracket 11 is not indispensable for the present invention. In an alternative embodiment, the center pin 12 may be integrally connected to the steering shaft 6. In this case, the pin holder 14a of the holder 14 on the side of the steering axle 7 need be formed in such a manner that a pair of plate members having the through holes 14c through which the center pin 12 is received is arranged at an interval spaced longitudinally of the vehicle body.

Therefore, the present examples and embodiments are to be considered as illustrative and not restrictive, and the invention is not to be limited to the details given herein but may be modified within the scope of the appended claims.

What is claimed is:

1. A swing mechanism of a steering axle in a three-wheeled industrial vehicle, comprising:
    a steering axle;
    a pair of steerable wheels supported on both sides of the steering axle;
    a steering shaft connected to the steering axle for rotating the steering axle in a steered direction, the steering shaft being synchronously rotated with a steering wheel of the vehicle;
    a center pin arranged at a lower end of the steering shaft in a longitudinal direction of the vehicle; and
    a holder formed on the steering axle, the holder being coupled to the center pin so as to be swingable.

2. The swing mechanism according to claim 1, wherein a pin holder bracket is integrally connected to a lower end of the steering shaft, the center pin being connected to the pin holder bracket.

3. The swing mechanism according to claim 2, wherein a pair of the pin holder brackets is spaced at an interval that is larger than a diameter of the steering shaft.

4. The swing mechanism according to claim 1, wherein the steering shaft includes a stopper plate, the swing mechanism further comprising:
    a stopper arranged on both sides of the stopper plate in a direction of vehicle width in facing relation to the steering axle for regulating a swinging motion of the steering axle.

5. The swing mechanism according to claim 4, wherein the stopper is made of steel.

6. The swing mechanism according to claim 4, wherein the stopper is made of one of an elastic material and a damping member.

7. The swing mechanism according to claim 4, wherein the swinging clearance is varied by changing a vertical length of the stopper.

8. The swing mechanism according to claim 4, wherein the swinging clearance is varied by changing a shape of a lower end of the stopper.

9. The swing mechanism according to claim 1, wherein the three-wheeled industrial vehicle is a three-wheeled forklift truck.

* * * * *